Nov. 29, 1932.                G. R. SOULÉ                1,889,041
                              NECKTIE PRESSER
                           Filed Aug. 26, 1929
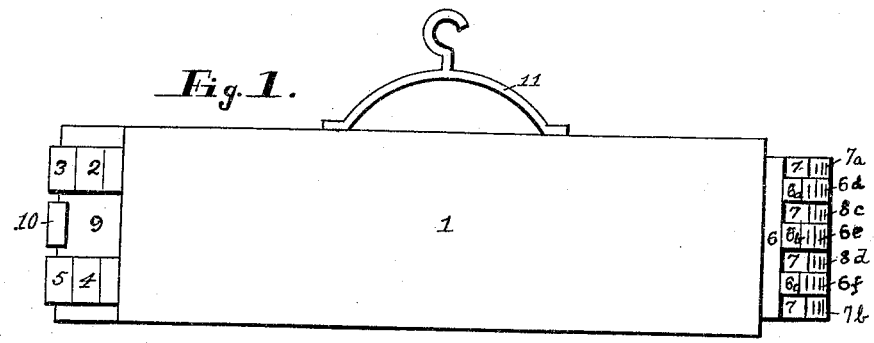
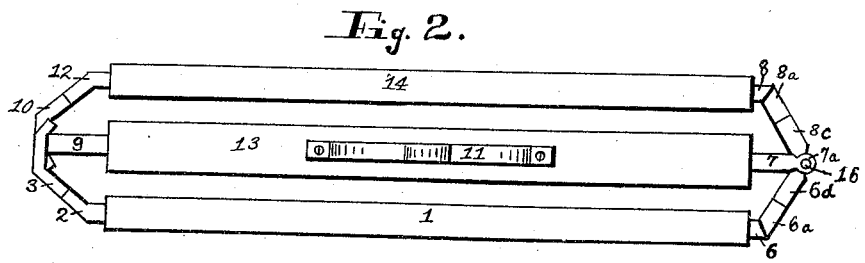
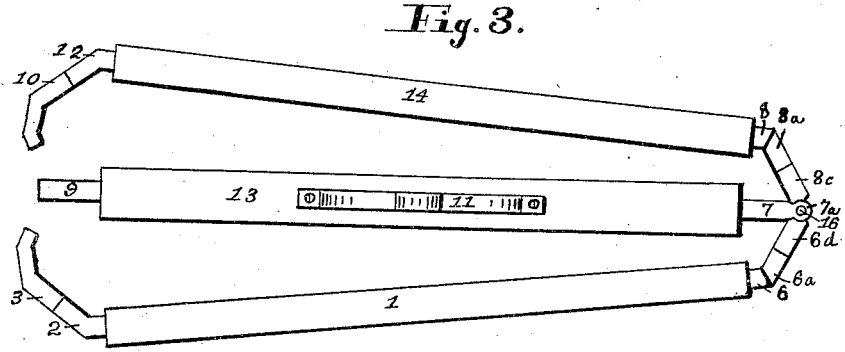
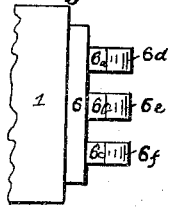 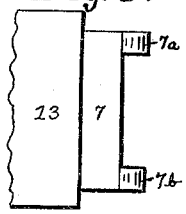 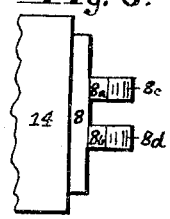 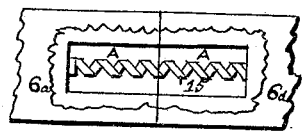
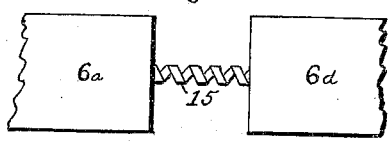
INVENTOR
GILBERT RUBIDGE SOULÉ
BY
William Sea Jr.
ATTORNEY Patented Nov. 29, 1932

1,889,041

UNITED STATES PATENT OFFICE

GILBERT RUBIDGE SOULÉ, OF SAN FRANCISCO, CALIFORNIA

NECKTIE PRESSER

Application filed August 26, 1929. Serial No. 388,415.

The object of my invention is to provide a simple and useful device for pressing out the wrinkles in neckties after they have been worn, so that such neckties will have a new and fresh appearance when worn after being contained in my invention.

For a full understanding of the invention and the merits thereof, and to acquire a knowledge of the details of construction, reference is to be had to the following description and accompanying drawing, in which Figure 1 is a side elevation of the device; Fig. 2 is a top view of Fig. 1; Fig. 3 is a top view of Fig. 1 with the side members disengaged and spread; Fig. 4 is a side elevation of one end of the member 1; Fig. 5 is a side elevation of one end of the member 13; Fig. 6 is a side elevation of one end of the member 14; Fig. 7 is a side elevation of the members 6 and 6a, with a portion of each cut away to show hole A in the end of each, and the spring 15 therein; and Fig. 8 is a side elevation of members 6 and 6a showing the spring 15 when the ends of the members 6 and 6a are spread apart.

Corresponding and like parts are referred to in the following description and indicated in all the views of the drawing by the same reference numerals or letters.

In the drawing, 1 designates a member, substantially as shown in the drawing, having suitably attached at one end side extensions bent substantially as shown, which extensions are in sets, 2 and 3, and 4 and 5. At the other end, the member 1 has suitably attached thereto a side extension bent substantially as shown, which extension 6 is shaped substantially as shown in the drawing, having its outer edge toothed substantially as shown in Fig. 4, which teeth 6a, 6b and 6c have their extensions 6d, 6e and 6f, which are holed to register with a pin 16, shown in Figs. 2 and 3.

13 designates a member, shaped substantially as shown in the drawing, having suitably attached at one end a side extension 9. At the other end, the member 13 has suitably attached thereto a side extension 7, shaped substantially as shown, and having its outer edge toothed substantially as shown in Fig. 5, which teeth 7a and 7b are holed to register with the pin 16. Member 13 is furnished with a hanger 11, suitably attached to the top edge thereof.

14 designates a member, shaped substantially as shown in the drawing, having suitably attached at one end a side extension bent substantially as shown, which extension is in a set, 12 and 10. At the other end, the member 14 has suitably attached thereto a side extension 8, shaped substantially as shown, and having its outer edge toothed substantially as shown in Fig. 6, which teeth 8a and 8b have their extensions 8c and 8d, which are holed to register with the pin 16.

As shown, the members 2 and 3, 4 and 5, 12 and 10, 6a and 6d, 6b and 6e, 6c and 6f, 8a and 8c, and 8b and 8d, where each member of each set abuts the corresponding member of that set, are holed at A, substantially as shown in Fig. 7, which view is used to represent the method of holing the ends of the members of each set. At the inner ends of the holes A of each set a tension spring 15 is suitably attached, as shown in Fig. 7.

When the members are assembled as shown in Figs. 1, 2 and 3, the extensions shown in Figs. 4 and 6, inserted in the extensions shown in Fig. 5, form a hinge with the pin 16.

When the device is closed, the extensions 3, 5 and 10 clasp the outer end of the extension 9 sufficiently to lock themselves with slight pressure.

While I have shown what I believe to be the best form of my invention, I do not wish to be limited thereto, as it is obvious that changes might be made in the arrangement of parts or details of construction, without departing from the spirit of my invention.

I now describe the operation of my invention. To press a necktie, or several neckties at the same time, the device is opened substantially as shown in Fig. 3, and the necktie or neckties wrapped around the member 13, and the members 1 and 14 are closed by pressing the members 3, 5 and 10 over the end of the member 9.

In order to overcome the possible bending of the members 1 and 14 by reason of the thickness of the wrapped necktie or neckties, the sets of members hereinbefore described spread as shown in Fig. 8, which view is used to represent all the sets as described.

The spring 15 not only permits the spreading of the members of each set, but after the device has been closed over the wrapped necktie or neckties for some time, it will contract gradually, and thereby draw in the members 1 and 14 toward the member 13, thereby giving a greater pressure on the wrapped necktie or neckties, and removing therefrom the wrinkles.

Having thus described my invention, what is claimed as new is:—

1. In a device of the class described, members, the center one of which has lateral side extensions, one of said extensions being drilled to register with a pin, two of said members having at one end thereof inwardly bent side extensions, the outer ends of said extensions being drilled to register with a spring, members registering with said extensions, said members being drilled to register with a spring, springs, said springs being secured in the holes drilled in said extensions and members, said last mentioned members being drilled at the ends thereof to register with a pin, a pin, said two first mentioned members having at the other ends thereof inwardly bent side extensions, the outer ends of said extensions being drilled to register with a spring, members registering with said extensions, said members being drilled to register with a spring, springs, said springs being secured in the holes drilled in said extensions and members, said last mentioned members being inwardly bent to form a catch over the end of the other of the lateral side extension of the said center member.

2. In a device of the class described, members, two of said members being provided at one end thereof with inwardly bent side extensions, the outer ends of which are drilled to register with a spring, members registering with said extensions, said members being drilled to register with a spring, springs, said springs being secured in the holes drilled in said extensions and last mentioned members, said members being drilled at the ends thereof to register with a pin, said two first mentioned members being provided at the other ends thereof with inwardly bent side extensions, the outer ends of which being drilled to register with a spring, members registering with said extensions, said members being drilled to register with a spring, springs, said springs being secured in the holes drilled in said last mentioned extensions and members, said last mentioned members being inwardly bent to form a catch, the center of said first mentioned members being provided with side extensions, one of which being drilled to register with a pin, the other of said side extensions registering with said inwardly bent members forming a catch, and a pin.

GILBERT RUBIDGE SOULÉ.